J. H. Rose,
Chalk-Line Holder.
No. 59,268. Patented Oct. 30, 1866.
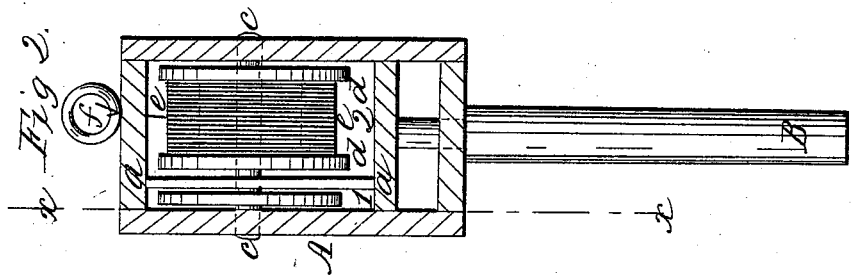
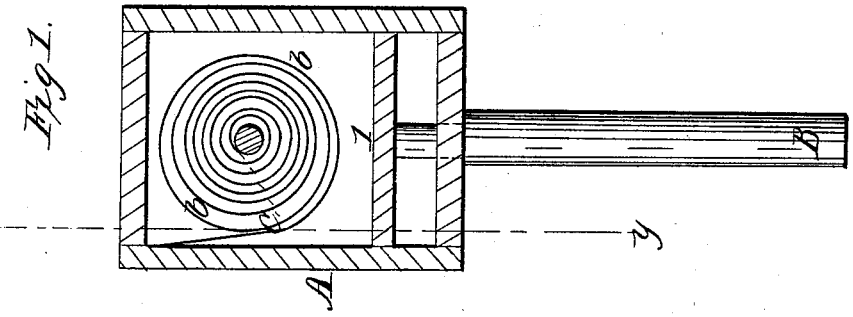
Witnesses:
Jas A Service
Wm Trewrn
Inventor:
J H Rose
Per Munn & Co
Attorneys

UNITED STATES PATENT OFFICE.

JONATHAN H. ROSE, OF MOUNT STERLING, ILLINOIS.

IMPROVEMENT IN CHALK-LINE WINDERS.

Specification forming part of Letters Patent No. 59,268, dated October 30, 1866.

*To all whom it may concern:*

Be it known that I, JONATHAN H. ROSE, of Mount Sterling, Brown county, State of Illinois, have invented a new and useful Improved Chalk-Line Winder; and I do hereby declare that the following is a full, clear, and exact description thereof, which will enable others skilled in the art to make and use the same, reference being had to the accompanying drawings, forming part of this specification, in which—

Figure 1 is a section of the box containing the reel, showing the coil-spring for winding up the chalk-line on the reel, taken on the line $x\ x$, Fig. 2. Fig. 2 is a section of the same, taken on the line $y\ y$, Fig. 1, showing the reel upon which the chalk-line is wound.

Similar letters of reference indicate like parts.

This invention relates to a reel for winding a carpenter's chalk-line, after it has been used, by means of a self-acting coil-spring, which, with the reel, is inclosed in a small hand-box, thereby furnishing a convenient and useful instrument for a workman, saving much time in winding the chalk-line, and keeping clean and in good order, always ready for use.

A represents a small flat rectangular wooden box, with a handle, B, at one end. The box is divided into two compartments by a thin partition, $a\ a$. A narrow compartment, No. 1, contains a long flat coil-spring, $b\ b$, the outer end of which is fastened to one side of the box, as shown in Fig. 1, and the other or central end of the spring to a spindle, $c\ c$, running through the center of the partition $a\ a$, and into holes in the flat sides of the box A, for the bearings of the spindle. A wider compartment, No. 2, contains a winder or reel, $d\ d$, fastened on the spindle $c\ c$, around which a chalk-line, $e\ e$, is wound, having one end free and passing through a small hole in the end of the box, with a ring, $f$, or other suitable holder fastened to it outside of the box.

The chalk-line is placed upon the reel so that when it is wound up the coil-spring $b$ is fully expanded, and when it is drawn out for use by the holding-ring $f$ the spring will be contracted or closed around the spindle $c\ c$ by the turning of the spindle; and when the strain upon the holding-ring $f$ is relieved the spring will draw the chalk-line back into the box and wind it up on the reel $d\ d$ by the expansion, which also turns the spindle $c\ c$.

Having described the construction and operation of my invention, what I claim as new, and desire to secure by Letters Patent, is—

As an article of manufacture, the line-winder herein described, the same consisting of the coil-spring $b$, spindle $c$, and reel $d$, in combination with the partitioned box A and handle B, substantially as and for the purpose specified.

The above specification of my invention signed by me this 14th day of July, 1866.

JONATHAN H. ROSE.

Witnesses:
W. L. VANDEVENTER,
MARTIN BROOKS.